(12) United States Patent  (10) Patent No.: US 6,649,202 B1
Huxel  (45) Date of Patent: Nov. 18, 2003

(54) FLAT PLATE FLAKING DEVICE (76) Inventor: Edward T. Huxel, 7513 Lake Highland Dr., Ft. Worth, TX (US) 76179

( * ) Notice: Subject to any disclaimer, the term of this patent is extended or adjusted under 35 U.S.C. 154(b) by 0 days.

(21) Appl. No.: 09/659,530

(22) Filed: Sep. 12, 2000

(51) Int. Cl.⁷ .................................................. A23D 9/05
(52) U.S. Cl. ........................ 426/98; 426/100; 426/291; 426/601; 426/604; 426/515; 426/524; 62/71; 62/74; 62/347; 62/354
(58) Field of Search ................................ 62/66, 71, 74, 62/353, 354, 347; 264/5, 7; 426/601, 417, 515, 524, 89, 96, 98, 100, 101, 289, 291, 604

(56) References Cited

U.S. PATENT DOCUMENTS

| 788,446 | A | | 4/1905 | Wilson | |
|---|---|---|---|---|---|
| 2,025,757 | A | * | 12/1935 | Lindsey | 62/114 |
| 2,412,203 | A | | 12/1946 | Brunkhurst | 99/192 |
| 2,491,837 | A | * | 12/1949 | Smith-Johannsen et al. | 62/172 |
| RE23,247 | E | * | 7/1950 | Rigby | 62/107 |
| 3,020,732 | A | * | 2/1962 | Carpenter | 62/345 |
| 3,159,986 | A | * | 12/1964 | King | 62/354 |
| 3,240,607 | A | | 3/1966 | Davies et al. | 99/118 |
| 3,436,927 | A | * | 4/1969 | Gruber | 62/75 |
| 3,514,297 | A | | 5/1970 | Campbell, Jr. et al. | 99/118 |
| 3,950,561 | A | | 4/1976 | Collins | 426/417 |
| 3,973,053 | A | | 8/1976 | Galusky et al. | 426/601 |
| 4,043,140 | A | * | 8/1977 | Wendt et al. | 62/66 |
| 4,075,868 | A | * | 2/1978 | Bartholmey | 62/347 |
| 4,232,052 | A | | 11/1980 | Nappen | 426/601 |
| 4,469,710 | A | | 9/1984 | Rielley et al. | 426/541 |
| 4,549,408 | A | * | 10/1985 | Lee et al. | 62/320 |
| 4,891,233 | A | | 1/1990 | Belanger et al. | 426/94 |
| 4,998,464 | A | * | 3/1991 | Kubacki | 99/455 |
| 5,268,191 | A | | 12/1993 | Crosby | 426/606 |
| 5,431,945 | A | * | 7/1995 | Miller et al. | 426/580 |
| 5,770,102 | A | * | 6/1998 | Torii et al. | 252/70 |
| RE36,785 | E | | 7/2000 | Colson et al. | 426/551 |
| 6,153,233 | A | * | 11/2000 | Gordon et al. | 426/90 |

FOREIGN PATENT DOCUMENTS

| GB | 2176143 A | | 12/1986 |
|---|---|---|---|
| JP | 361106314 A | * | 5/1986 |

OTHER PUBLICATIONS

GEOL.311 Mineralogy I, J.M. Rice, 1020–98, Lecture 6, Part II, Crystal Growth, Twinning and Defects.

* cited by examiner

Primary Examiner—Drew Becker
(74) Attorney, Agent, or Firm—Shughart Thomson & Kilroy P.C.

(57) ABSTRACT

An apparatus and method of preparing solid flakes of fats and emulsifiers is provided utilizing a generally flat, cold plate to solidify the fat or emulsifier.

21 Claims, 8 Drawing Sheets

FLAT PLATE FLAKING DEVICE

FIELD OF THE INVENTION

The present invention relates to the manufacture of flakes or chips of congealed fats, or more technically triglycerides, including edible fats, lard and various commercial food products such as edible oils and emulsifiers. In addition, the present invention relates to the field of layering or encapsulating solid or flaked material within other materials. This layering or encapsulation of solids can take the form of: (1) solids mixed in a liquid oil which is hardened and flaked; (2) solids directly added to a liquid which is in the process of being hardened and flaked; and (3) encapsulation of solids with liquids and liquid/gas mixtures of both edible and inedible material.

The present invention is particularly suited to flaking emulsifiers. Emulsifiers or emulsifying agents include mono- and diglycerides of fatty acids, propylene glycol, mono- and di-esters of fatty acids, glycerol-lactose esters of fatty acids, ethoxylated or succinylated mono- and diglycerides, lecithin, diacetyl tartaric acid esters or mono- and diglycerides, sucrose esters of glycerol, phospholipids or equivalents there of and mixtures thereof.

A variety of edible oils are contemplated for use with the present invention, in particular, oil from oil seeds including cotton seed oil, soy bean oil, corn oil, peanut oil, sunflower oil, castor seed oil, safflower oil, palm and olive oils, and the like. The term "fat" is used generally to refer to edible fats and oils comprising triglycerides, fatty acids, fatty alcohols, and ester of such acids and alcohols. For the purposes of this invention, appropriate components are triglycerides of straight chain or branch chain, saturated or unsaturated monocarboxylic acids having from 10 to 28 carbon atoms. suitable sources of such fats are: (1) vegetable fats and oils, as indicated above; (2) meat fats, such as tallow or lard; (3) marine oils, such as menhaden, pilchard, sardine, whale or herring; (4) nut fats and oils such as coconut palm or peanut; (5) milk fats, such as butter fat; (6) coca butter and coca butter substitutes, such as shea or illipe butter; and (7) synthetic fats or a re-esterified fats with fractionated fatty acids.

The present invention further contemplates the addition of various additives into the mixtures to be flaked. It will be appreciated that the use of additives in liquid compositions will lower the melting point of the liquid composition. These additives can be flavorings such as butter, buttermilk, cinnamon, or color such as beta carotene or annoretta or saffron. Solids or solid powders may be included such as non-fat dry milk solids or the pulp of various fruits such as raspberry and blueberry and along with other natural or imitation flavorings or colorings. The present invention overcomes the depression of the melting point which occurs when additives are included in a liquid.

BACKGROUND OF THE INVENTION

It has long been known that fatty substances could be cooled to a solid or semi-solid by applying a hot or warm liquid or semi-liquid of the fat to a rotating drum or continuous cooling belt. In U.S. Pat. No. 788,446 to A. R. Wilson, a liquid fat is sprayed onto a rotating drum or cylinder which is cooled with ice or ice and salt. As the drum rotates, the previously applied liquid is scraped from the drum, and the scraped area of the drum is then subsequently presented for another application of the fat or liquid to be congealed.

These types of drum cooling or mechanical cooling are relatively successful for substances having a sufficiently high melting point. However, as the melting point decreases, the resident's time of the substance on the drum must be increased in order to chill the liquid to a sufficient hardness that upon scraping the substance from the drum, the material cleanly breaks free of the drum and is sufficiently solid that it does not melt together with other materials scraped from the drum. In addition, as the melting point of the liquid applied to the drum becomes lower and lower, the opportunity for the material to melt together again, or to agglomerate, increases due to the continued release of heat from within the formerly liquid substance as it becomes more and more solid after being scraped from the roller and packaged.

In particular, as a substance is chilled to change the material from a liquid to a solid, the heat within the liquid substance is removed, and the material is reduced in temperature to a point at which crystallization of the material begins and a solid of the material begins to form within the liquid. The solid formation increases as heat is removed from the liquid substance. After a time, sufficient heat will have been removed from the substance that the once liquid material becomes generally solid. However, while a material has become generally solid, it may not be fully crystalized and stabilized at a useful temperature. Rather, the material will continue to undergo greater solidification as an increasing percentage of the material becomes a solid crystal. During this period of continued crystallization, heat continues to be given off by the material as it turns from a semi-solid into a solid or becomes stabilized at a particular temperature below the melting point of the original liquid substance. This represents the release of the "heat of crystallization" or the release of the "latent heat of crystallization" of the substance.

In the process of forming chips or flakes from triglycerides, emulsifiers or other edible and non-edible materials, the general process is to apply the liquid substance to a rotating, chilled drum, and to allow the material to stay in contact with the drum for sufficient time to permit the liquid to become sufficiently solid that it can be scraped from the drum. During the scraping process it is preferred that the solid or semi-solid break into flakes or fragments rather than peeling from the drum as a continuous sheet. Once the flakes or fragments of the substance are removed from the drum, they are usually packed into a container and placed into a cooling room for additional cooling and to retain the material in a solid state. It is during this period in the cooling room that additional solidification of this substance continues. As a result of this further solidification, internal heat is given off by the material which is referred to as the "latent heat of crystallization." Once crystal growth, or solidification, has been initiated in a substance it is necessary, for additional solidification to occur, that heat be removed or transferred from the body undergoing crystallization or solidification. In the case of a partially solidified liquid which has been placed into a packing box, the latent heat of crystallization becomes trapped within the mass of material in the box and begins to generally raise the temperature of the substance. This can result in the material within the package agglomerating due to the latent heat of crystallization partially melting the solid which was formed on the rotating cold drum.

Figure 6:
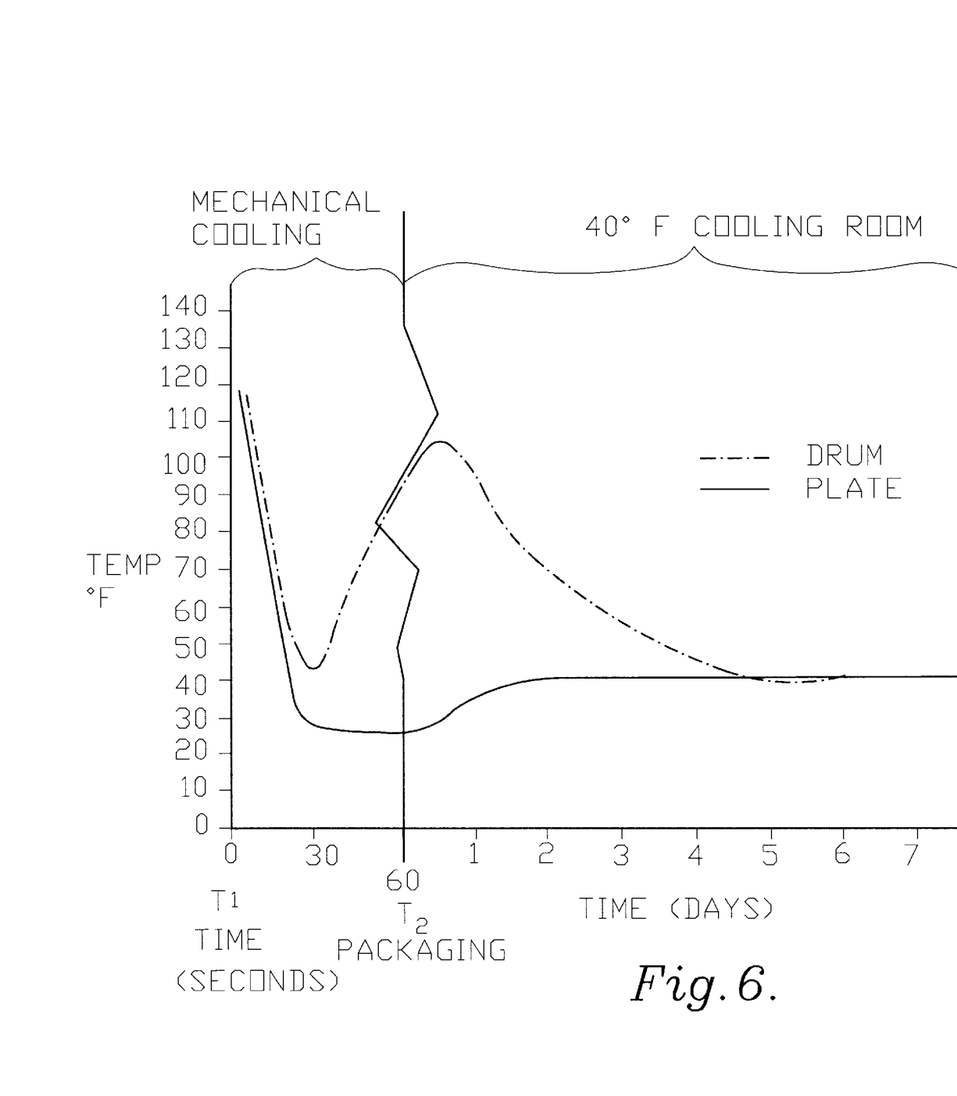
FIG. 6 is graph of temperature with respect to time for a liquid undergoing initial mechanical cooling on the present invention and on a rotating drum followed by a residence period in a cooling room and showing the rise in temperature of the packaged solid formed on a rotating drum during the residence period.

A graphical representation of this phenomenon can be seen in FIG. 6. In FIG. 6, the intermittent line indicates material having a melting point of approximately 114° F. which was initially cooled for 10–30 seconds on a roller. The graph shows that during the mechanical cooling period (T1) the temperature decreases from generally 5° F. above the melting point temperature of the fat to be flaked to approximately 50° F.–60° F. At time T2, packaging occurs as the material is scraped off the roller. At time T2, the time interval changes to days. Once the material is removed from the roller the temperature of the material begins to rise. This rise in temperature continues during the first portion of time T2 and after the packaged material is placed into a 40° F. cooling room. It is shown in FIG. 6 that the temperature of the material once packaged and residing in a cooling room continues to rise. This temperature increase is due to the latent heat of crystallization which causes the temperature of the packaged material to increase to approximately 100° F. The temperature of the material then decreases to the temperature of the cooling room over a period of an additional two to three days. This increase in temperature in the packaged material resulting from the latent heat of crystallization can cause agglomeration of the packaged material.

Figure 10:
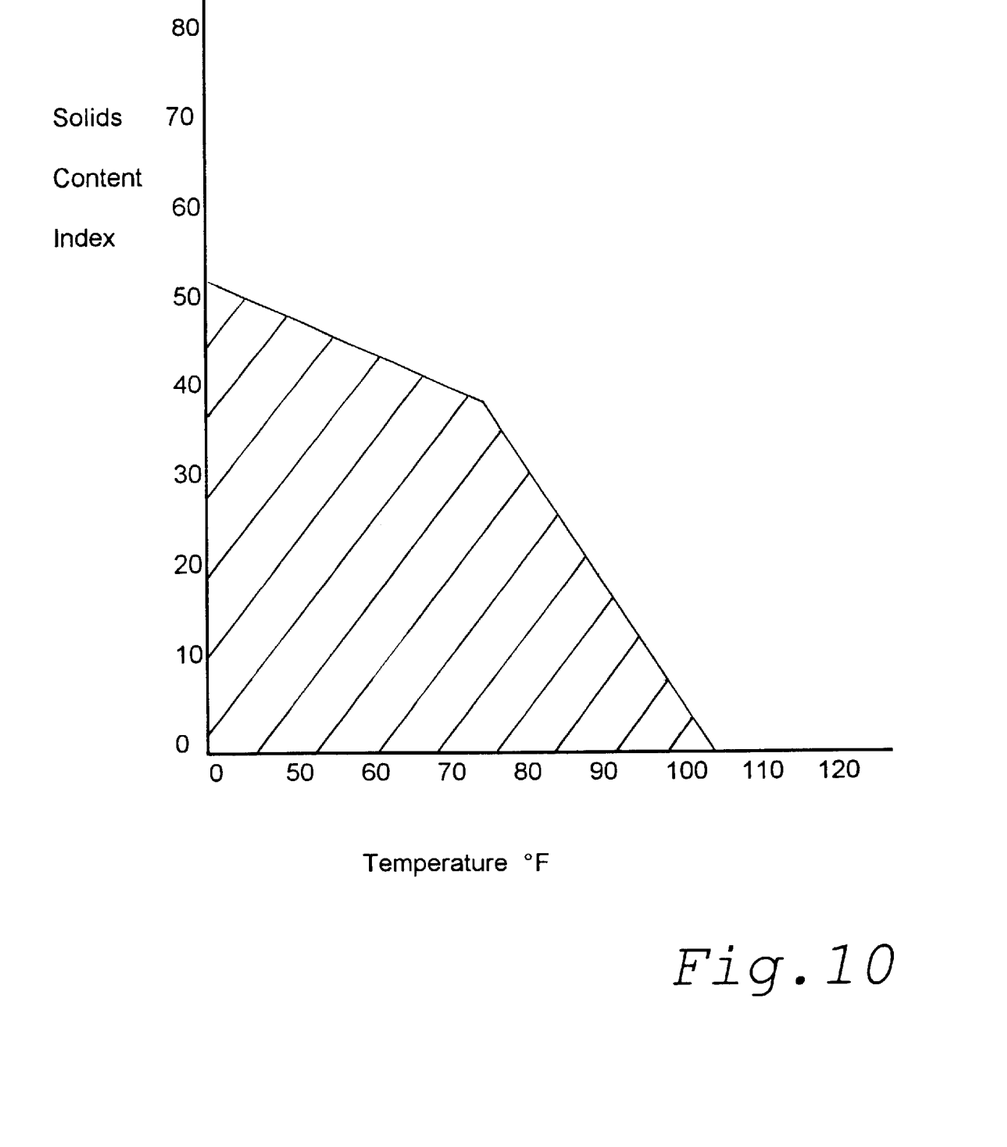
FIG. 10 is graph of temperature with respect to the Solids Content Index of a mixture of triglycerides and showing the various solids and liquid content of the mixture at different temperatures and showing the agglomeration boundary for such mixtures.

This rise in latent heat is a particular problem in materials having a Solids Content Index which is below the line graphed in FIG. 10. FIG. 10 shows the solids content of a mixture of fats at various temperatures. The solids content index is a manufacturing standard used to measure the extent of hydrogenation in the fat components used in a mixture. Over a limited range, the solid content index (SCI) value is numerically, approximately equal to the actual percent solids in the mixture. At high temperatures the fat product will be completely melted. At low temperatures, the fat can be completely solid. In between these low and high temperature ranges, there are varying degrees of solid fat content in the fat composition. By selection of varying degrees of hydrogenated triglycerides, a variety of SCI profiles for various fat compositions can be developed. With respect to fat mixture suitable for flaking, the line in FIG. 10 represents an agglomeration boundary. For mixtures of hydrogenated triglycerides having solids compositions which fall below the agglomeration boundary, conventional drum and belt methods of flaking do not provide sufficient chilling time or sufficient temperature reduction in the mixture to: (1) produce sufficient nucleation in the fat mixture to allow flaking; (2) prevent the solidified fat from forming a sheet of material rather than flaking; and (3) reduce the temperature of the solidified material sufficiently to avoid re-melting of the material due to the latent heat of crystallization once the material is removed from the belt or roller and packaged.

The present invention avoids all these problems of roller and belt flaking devices and permits the flaking of fat and or emulsifier mixtures which have a solids content which is below the agglomeration boundary shown in FIG. 10.

Yet another drawback of the use of drum cooling for materials of the kind previously described is that when the melting point of the material becomes sufficiently low, generally 105° or below, the latent heat of crystallization will tend to be sufficient to virtually remelt the material or to cause the flakes or chips of the material to become a connected mass within the packaging material. Therefore, the use of rotating drum devices to cool materials having low melting points becomes ineffective, and triglycerides and other oils which have low melting points cannot be mixed with other substances which would have the effect of lowering the melting point of the triglyceride or the fatty substance to a point at which the drum cooling method would be ineffective as a result of the latent heat of crystallization causing the newly solidified material to form a mass once placed into packaging.

Another problem is commonly encountered with emulsifiers that do not contain a sufficient amount of nucleating hard fat to initiate crystallization. In this case the emulsifier does not form a flake or a chip when cooled, but forms a continuous sheet of material which peels-off the belt or drum cooling device.

It will be appreciated by those skilled in the art that increasing retention time on the cooled rotating drum is an insufficient solution to this problem. Depending on the material being applied to the drum, if it is cooled too completely while on the drum, it will crack away from the drum and fall off the drum prior to it reaching the scraper blade or reaching a point at which collection of the material is desired. In certain types of drum cooling systems, the liquid is applied by the bottom of the drum rotating through a vat or pool of warmed liquid. The liquid then adheres to the drum and is cooled during the rotation of the drum, and the material is scraped from the drum prior to a second emersion in the vat of liquid. In this situation, slowing the drum can result in substantial loss of heat into the vat of hot or warm oil or triglyceride and can result in the heating of the material in the vat and the cooling of the drum operating at cross purposes.

Therefore, it would be beneficial to the food industry in general if an apparatus and method were available to solidify low-melting triglycerides and edible oils, emulsifiers and mixtures thereof and the like which avoided the drawbacks of the cold drum method of forming such solids. In addition, it would be a great benefit to the food industry if the method and apparatus allowed multiple substances to be layered upon one another to form a sandwiched solid of several different materials which could then be chipped or flaked and incorporated into foodstuffs.

The aforementioned debilities are overcome by the present invention, and the desirable advantages and solutions of the present invention will become apparent to those skilled in the art upon reading the following specification in conjunction with the drawings provided herein of a preferred embodiment of the invention.

SUMMARY OF THE INVENTION

The present invention utilizes a generally horizontal surface of a cold plate to allow longer contact times of a liquid with a cold plate in order to convert the liquid to its solid form and to effect a greater degree of solidification of the liquid than is possible using the chilled rotating drum method of solidification of liquids. The present invention further allows for increased removal of the latent heat of crystallization from the substance being solidified to reduce the rise in temperature within the material once it is packaged which results from the latent heat of crystallization in materials which are initially solidified using chilled rotating drum or moving belt apparatus and methodology.

In particular, the present invention utilizes a horizontal cooling plate to receive applications of a liquid material for conversion from the liquid form to the solid form, and to provide the material with sufficient cold plate contact time to greatly reduce the remaining latent heat of crystallization after solidification of the material. The material is then scraped from the work surface of the cooling plate. The present invention accomplishes this method of solidifying liquids by moving an applicator or dispenser or spray nozzle across the surface of the cooling plate to dispense onto the cooling plate the liquid material. The method then scrapes the cooling plate to remove the solidified material from the work surface of the cooling plate by moving the scraper across the surface of the cooling plate. In a preferred embodiment of the invention, the apparatus utilizes a motordriven screw drive rod to move a carriage holding spray nozzles and scrapers across the surface of the cooling plate to perform the previously described functions. However, it will be appreciated that any manner of moving the dispenser and scraper across the cooling plate would be an equivalent device.

In this apparatus and method, the objects of the present invention can be achieved which consist of cooling a liquid to a solid form while removing substantially all of the latent heat of crystallization from the formed solid to allow flaking of mixtures having a high percentage of low melting components.

Another object of the present invention is to allow increased retention time of a liquid on a cooling surface to permit removal of nearly all of the latent heat of crystallization and to lower the temperature of the resulting solid to a temperature which will allow the solid to easily be flaked and to avoid formations of sheets of material.

Another object of the present invention is to provide for simultaneous application of multiple liquids or multiple solids or mixtures of solids, liquids and/or gasses such as nitrogen or air onto a cooling plate so that multiple layered solids and solid solutions can be produced.

Yet another object of the present invention is to allow sequential applications of liquids and solids to a cold plate to provide multi-layered solids which can then be removed from the plate in their solid form.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

To FIG. 5 is a transverse cross-sectional view taken along line 5—5 of FIG. 1 and showing the mounting of the dispenser on a carrier for movement of the dispenser across the plate work surface to dispense a substance onto the work surface.

DESCRIPTION OF A PREFERRED EMBODIMENT

Figure 1:
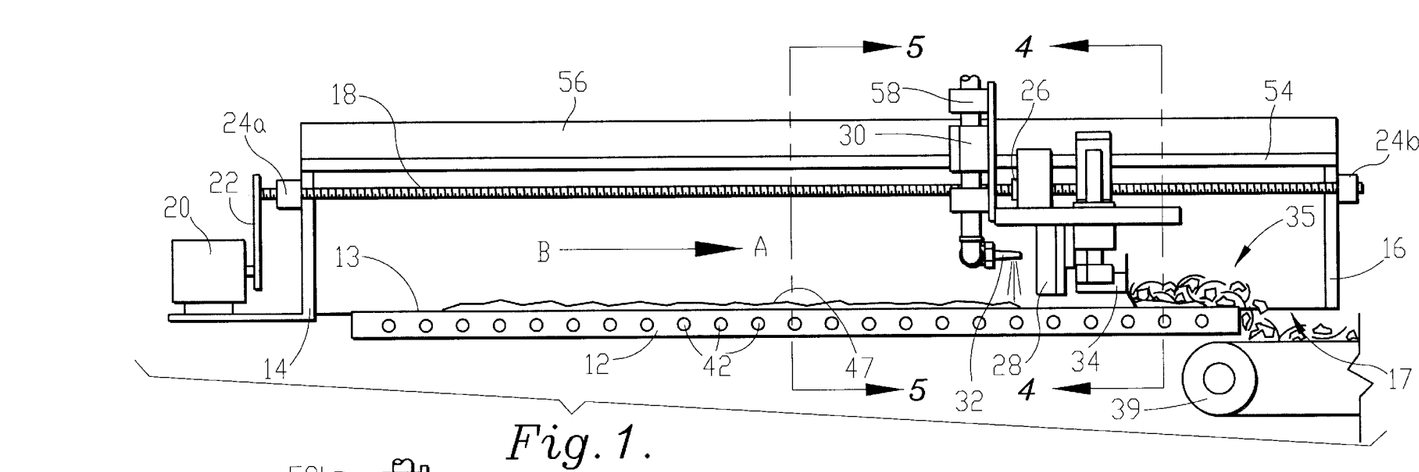
FIG. 1 is a longitudinal cross-sectional view taken along line 1—1 of FIG. 7 of a preferred embodiment of the invention showing a scraper and a dispenser disposed for travel across the plate work surface.

Referring now to FIG. 1, a longitudinal cross-sectional view of plate flaker 10 is shown. Plate flaker 10 is comprised of cooling plate 12 which is supported by a frame or base (not shown). Cooling plate 12 is cooled to a selected temperature by circulating coolant through voids 42 of cooling plate 12. Mounted above work surface 13 of cooling plate 12 is carriage 28 which is mounted on screw drive 18 to permit back and forth or reciprocating movement of carriage 28 across work surface 13 of cooling plate 12. Screw drive 18 is mounted generally above cooling plate 12 by bearings 24a, 24b which are mounted on head plate 14 and end plate 16. Screw drive 18 extends through bearing 24a for connection to belt 22 which is attached to screw drive motor 20. Drive motor 20 is a reversible motor which allows screw drive 18 to be turned selectively in the clockwise or counter-clockwise direction in order to impart reversible movement to carriage 28 to allow carriage 28 to move back and forth across cooling plate 12.

Still referring to FIG. 1, in a preferred embodiment, carriage 28 has spray nozzle 32 and flow valve 30 attached to carriage 28 to accomplish the distribution or spraying of a liquid material 47 onto cooling plate 12. The spraying of material onto cooling plate 12 is accomplished during the movement, or reciprocation, of carriage 28 on screw drive 18 along the distance of work surface 13 of cooling plate 12. Also attached to carriage 28 is scraper 34. Scraper 34 is moveable between a raised position which is out of contact with work surface 13 and a lowered position which is in contact with work surface 13. Scraper 34 is raised and lowered by pneumatic cylinders 36 which are provided with cylinder guide rods 38 to stabilize movement of scraper 34.

In a preferred embodiment (FIG. 4), cylinders 36 are pneumatically activated by gas pressure from line 37' causing downward travel of scraper 34. The upward movement of scraper 34 is operated by gas pressure in line 37 (FIG. 4) to active cylinder 36. It will be appreciated by those skilled in the art that carriage 28 can carry more than one spray nozzle 32 and flow valve 30. For example, multiple spray nozzles 32, each equipped with a flow valve 30, allow the spraying of multiple components onto work surface 13 of cooling plate 12. By way of example and not limitation, it will be appreciated that a first spray nozzle 32 could deliver a first liquid onto work surface 13, while simultaneously, a second spray nozzle 32 is delivering a second liquid onto work surface 13, and while a third spray nozzle 32 or additional spray nozzles 32 are delivering additional liquids onto work surface 13. In this manner, a number of different liquids could be simultaneously delivered onto work surface 13 of cooling plate 12. Alternatively, the multiple spray nozzles 32 previously mentioned, could be operated in a sequential manner by alternating spray nozzles during multiple passes of carriage 28 on screw drive 18 across work surface 13.

By further way of example and not limitation, it may be useful to equip carriage 28 with multiple spray nozzles 32, each of which delivers a separate liquid or solid material onto work surface 13. For instance, during a first reciprocation or pass across work surface 13, a first spray nozzle 32 might deliver a base liquid onto work surface 13 to solidify the liquid into a solid. On a second pass, a second spray nozzle 32 might spray a powder aerosol onto the first layer, and on a third pass, a third spray nozzle 32 could deliver a second liquid layer or solid powder aerosol or solid via a solids applicator onto work surface 13 to build up a multiple layered product on work surface 13 of cooling plate 12. It will be appreciated by those skilled in the art that by the use of separate spray nozzles to deliver differing amounts of material onto work surface 13 that differential layer thicknesses could be provided onto work surface 13 to accumulate. Alternatively, it will be appreciated that the pump speed can be varied by slowing and increasing the pump speed to affect the flow of the material onto work surface 13 or to slow the travel of the carrier while maintaining constant material thickness on work surface 13. In addition, such variation in layer thickness could be achieved by increasing or slowing down the speed at which screw drive 18 rotates.

The addition of solid material onto work surface 13 can be accomplished through the use of a solids applicator which is well known in the industry. The solids applicator consists of a hopper having a flow tube descending therefrom and a rotating breaker bar mounted in the bottom of the hopper. As the hopper is moved across work surface 13 whether by attachment to a carriage 28 or another device for moving the hopper, the solid material which has been loaded into the hopper is distributed across work surface 13 to mix with other materials which have been loaded onto work surface 13.

Figure 2:
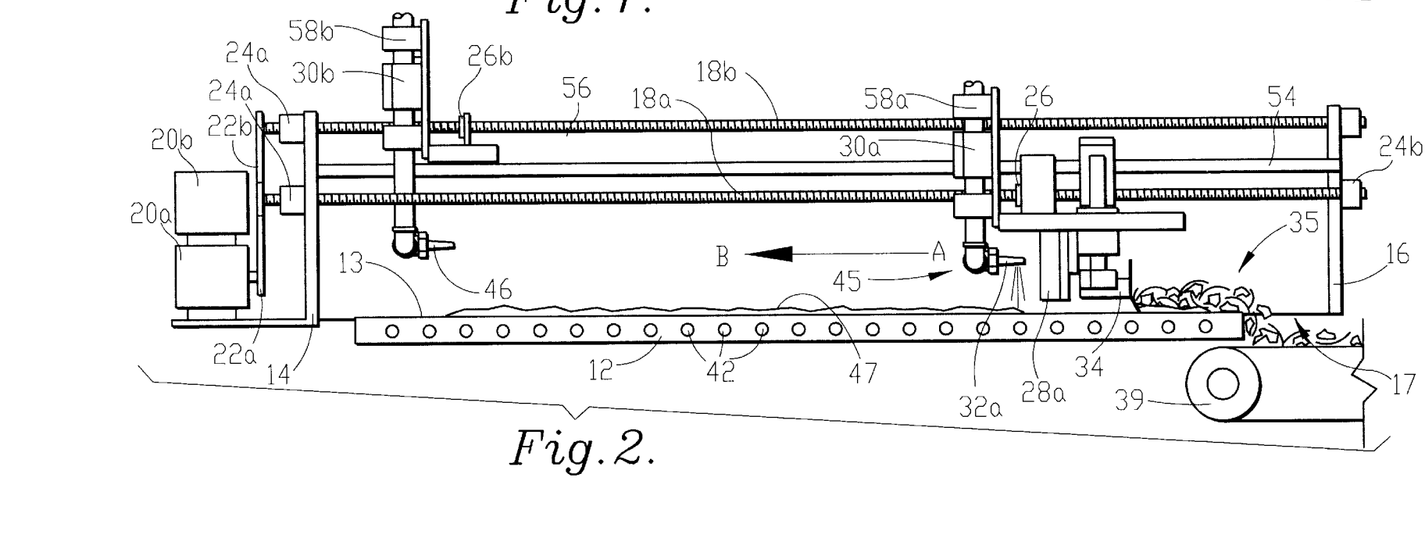
FIG. 2 is a longitudinal cross-sectional view of another preferred embodiment of the invention showing a scraper and a first and a second dispenser disposed for travel across the plate work surface.

Referring now to FIG. 2, an alternate method of providing for multiple applications of materials onto work surface 13 of cooling plate 12 will be discussed. In FIG. 2, an embodiment of the invention is shown in which a second applicator 46 is provided. Second applicator 46 allows for a second layer of material to be dispersed onto work surface 13 in a sequential manner by using applicators on multiple carriers.

In operation, the embodiment of FIG. 2 can apply a second layer from applicator 46 while following close behind first applicator 45. In FIG. 2, second applicator 46 has already completed laying down second applicator layer 47 onto work surface 13 and first applicator 45 is applying a second layer. In placing layer 47 on work surface 13, second applicator 46 has traveled from near first applicator 45 toward head plate 14, or in the direction of Arrow B. In placing a second layer onto work surface 13, and on top of second applicator layer 47, first applicator 45 travels toward second applicator 46 while spraying a liquid or a powder from nozzle 32a or from a solids applicator onto layer 47. Once first applicator 45 has completed its application of material onto work surface 13 on top of second applicator layer 47, scraper 34 of first applicator 45 can be lowered onto work surface 13. First applicator 45 is then moved in the direction of Arrow A to scrape the now solid material off of work surface 13 and toward end plate 16 where the solid material 47 will fall through opening 17 and onto conveyor 39.

Figure 3:
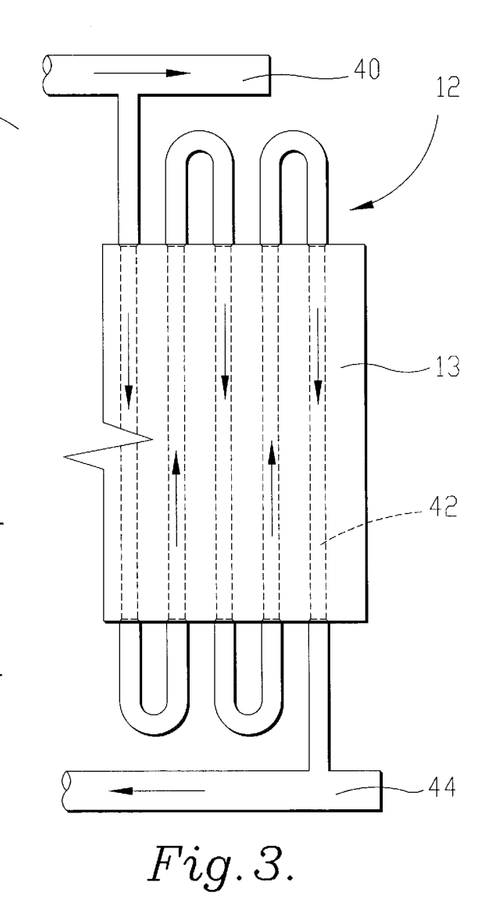
FIG. 3 is a fragmented plan view of the cooling plate of the embodiments of FIGS. 1 and 2 and showing the exterior coolant lines and showing, in phantom lines, the voids in the cooling plate to allow circulation of coolant within the plate.

Referring now to FIG. 3, the assembly used to cool plate 12 and work surface 13 is shown. FIG. 3 is a fragmenting plan view of cooling plate 12. Cooling plate 12 is provided with voids 42 which are bored completely through cooling plate 12. Voids 42 allow a coolant to be introduced into cooling plate 12 by coolant inlet pipe 40. The coolant is selected to establish cooling plate 12 at a temperature sufficient to change the material layered onto work surface 13 from a liquid into a solid that flakes. The coolant circulates through a section of cooling plate 12 and exits from cooling plate 12 by coolant return pipe 44. The coolant is then circulated through a compressor or refrigeration system to again reduce the temperature of the exiting coolant to the appropriate temperature for reuse to cool cooling plate 12.

Figure 4:
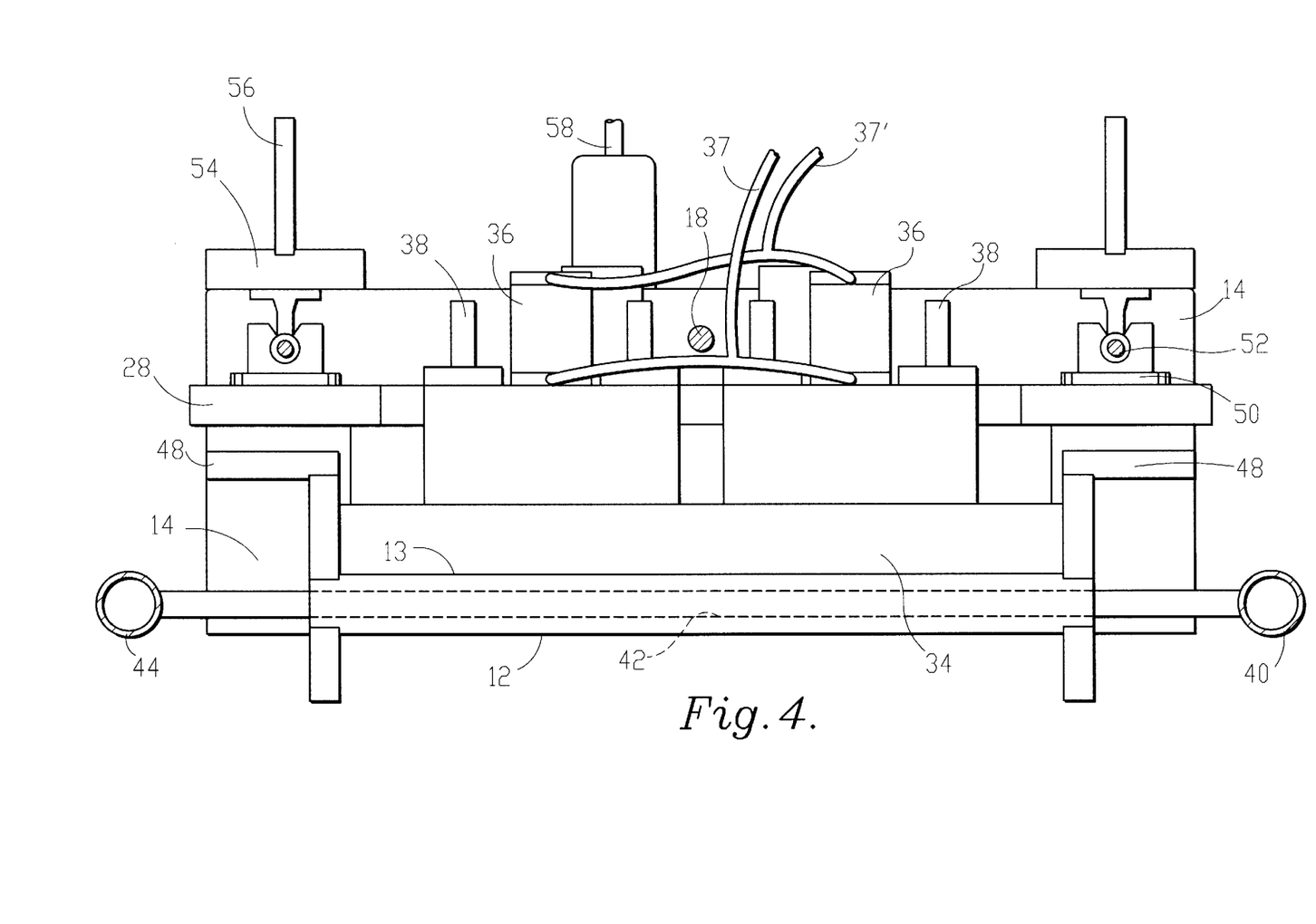
FIG. 4 is a transverse cross-sectional view taken along line 4—4 of FIG. 1 and showing the mounting of the scraper on a carrier for movement across the plate work surface and showing the scraper in contact with the cooling plate surface.

Referring now to FIG. 4, the transverse cross-sectional view of the embodiment shown in FIG. 1 presents scrapper bar 34 in its downward position so that it is in contact with work surface 13 of cold plate 12. Scrapper 34 is raised and lowered by pneumatic cylinders 36 and is stabilized during its movement by cylinder guide rods 38. In operation, once a material has been placed onto work surface 13 and has solidified, scrapper 34 is lowered onto work surface 13 and the carriage advanced in order to scrape the material off of work surface 13 and to push the material toward void or opening 17 (FIG. 1) and onto conveyor 39.

Figure 5:
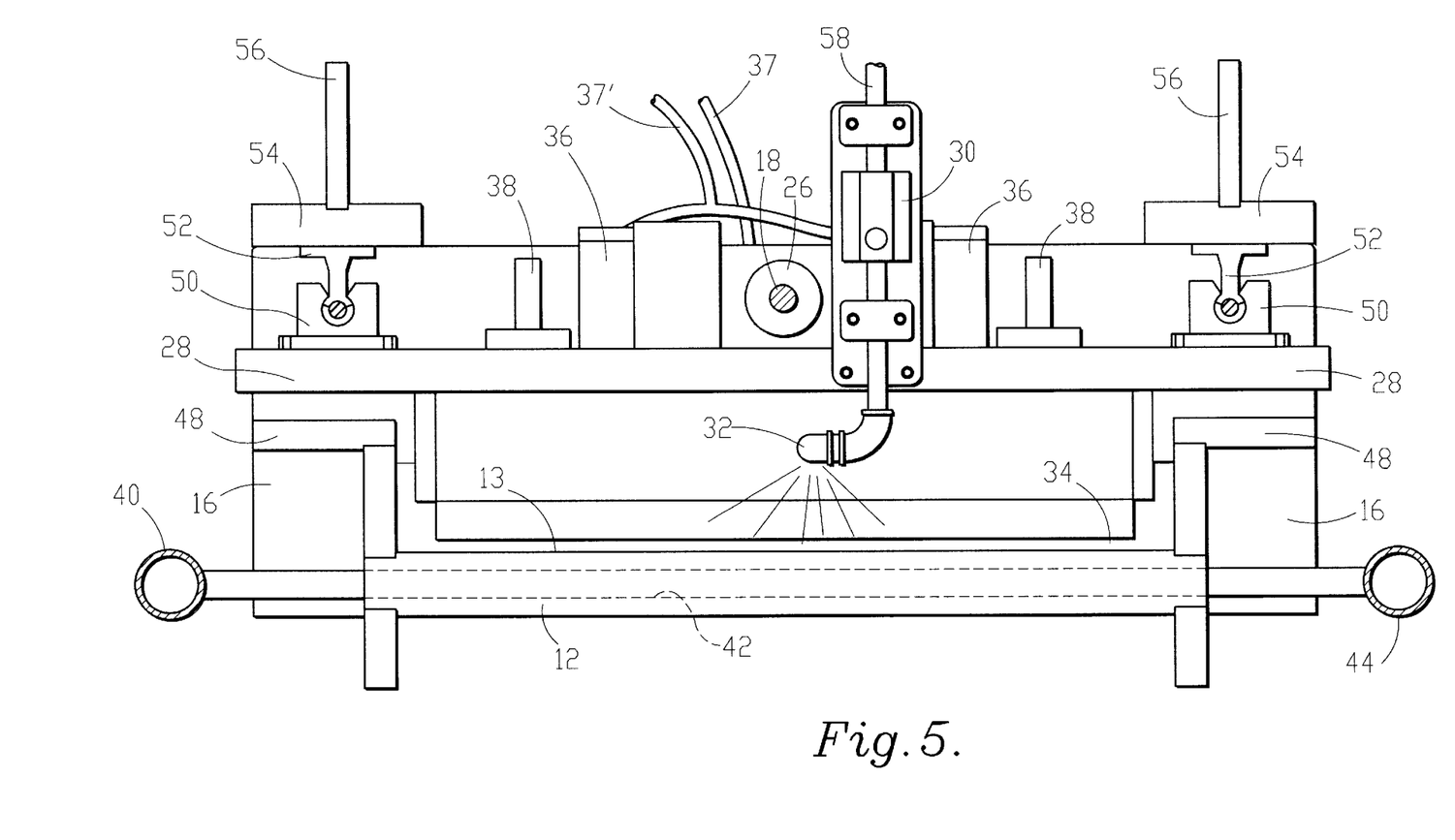

Referring now to FIG. 5, the mounting of carriage 28 will be discussed in greater detail. FIG. 5 is a transverse cross-sectional view of the embodiment of FIG. 1 and shows work surface 13 of cooling plate 12 to be below spray nozzle or dispenser 32. Dispenser 32 receives a liquid fluid supply by connection with feed tube 58 which is connected to a supply (not shown) of material to be layered onto work surface 13. Feed tube 58 travels toward dispenser 32 from a supply and terminates at flow valve 30. Flow valve 30 is, in a preferred embodiment, pneumatically operated and provides positive flow and flow shut off to dispenser or spray nozzle 32. Adjacent flow valve 30 is carriage drive block 26 containing a threaded nut mounted to a flange which is adapted to receive the threads of acme screw drive rod 18 which passes through carriage drive block 29. Carriage drive block 29 allows carriage 28 to travel along screw drive rod 18 as drive rod 18 is rotated in either a clockwise or counterclockwise direction by motor 20 and belt 22 (FIG. 1). Carriage 18 is directed in. its movement along the distance of cooling plate 12 by traveler bearings 50 which are attached to carriage 28. Traveler bearings 50 are connected to traveler rod 52 which is secured to support plate 54. This particular arrangement imparts stability and strength to the preferred embodiment and allows carriage 28 to operate continuously for long periods of time and reduces the number of moving parts which could result in failure during long hours of operation. Above support plate 54 is stand off plate 56 which can be used. to mount a second carriage 28b (FIG. 2) to allow use of additional dispensers or spray nozzles 32.

Referring now to FIG. 6, a graphical analysis of the beneficial results obtained from the present invention is shown. In FIG. 6, the temperature with respect to time is shown for a single substance which has been mechanically cooled by both a conventional rotating drum or roller method and the cooled flat plate of the present invention. Using the roller or rotating drum, it can be seen by examination of broken line that the liquid is placed on the drum at time Ti at a temperature of approximately 120° F. During the approximately 10–20 seconds exposure time to the chilled roller or drum; the temperature of the substance is reduced to approximately 60–65° F. which is the temperature at which the material sufficiently hardens to enable the material to be scraped off the drum and fragmented into flakes or chips at time T2. At time T2, packaging of the material occurs just after removal of the material from the belt, drum or roller.

In the case of the rotating drum method, the material is placed into a package and the package placed into a cooling room of approximately 40° within about two minutes of packaging. At time T2, the time period on FIG. 5 changes from seconds to days. The material which has been flaked on the rotating drum method then begins a rise in temperature shortly after removal from the drum. This deviation of temperature which continues over approximately the first three days the material is stored in the cooling room. This development of heat within the packaging is a result of the latent heat of crystallization which is given off as the material continues to harden within the package within the cooling room. At approximately the third day in the cooling room, the temperature of the packaging material begins to approach the temperature of the cooling room.

The temperature rise observed during the first one to three days in the cooling room due to the latent heat of crystallization is a substantial problem which results from the incomplete initial solidifying or crystallization of the material using the rotating drum method. Since the material is only partially solidified or crystallized on the rotating drum during the mechanical cooling period, additional solidification of the material continues during the cooling room, and the latent heat of crystallization is given off. This latent heat of crystallization as previously described tends to result in a rise in temperature of the packaged material. This rise in temperature can oftentimes be sufficient to bring the material again close to its melting point which results in fusion of the material within the package. This fusion problem is compounded by the palletizing of the packages for shipment. The grouping of the packages reduces the removal of heat from the packages and the internal packages on the pallet reach even a higher temperature than the outer packages.

This is a highly undesirable state and reduces the value of the material produced and also causes manufacturers of the material to institute a long holding period within a cooling room prior to shipment of the material. This long holding period increases inventory and stocks of packaged material which must be maintained in a cooling room for days, if not weeks, prior to shipment of the material. The present invention allows the reduction or elimination of the latent heat of crystallization temperature increase in packaged material and substantially shortens the amount of inventory which a producer needs to keep on hand prior to shipment and also reduces the amount of holding time of material prior to shipment. Both of these factors result in a substantial savings in production costs to the manufacturer.

Referring now to the solid line shown in FIG. 6, the results of the inventive method on the same liquid as was applied to the rotating drum will be discussed. The liquid is applied to the inventive flaking plate of the present invention at approximately 120°. During approximately the first ten to thirty (10–30) seconds of time in contact with the plate, the liquid drops in temperature from approximately 120° to approximately 25° and is converted to its solid state. The material is then scraped off of work surface 13 (FIG. 1) prior to time T2 after which it is immediately packaged. Subsequent to time T2, the material formed on the cold plate of the present invention undergoes only a slight rise in temperature due to latent heat of crystallization and production room temperature. In fact, in the example shown in FIG. 6, the temperature of the material rises to the temperature of the cooling room and stabilizes at the cooling room temperature of approximately 40° Fahrenheit. As is shown in the graph of FIG. 6, the material produced using the inventive method and apparatus exhibits little or no increase in temperature within the package due to the latent heat of crystallization.

Figure 7:
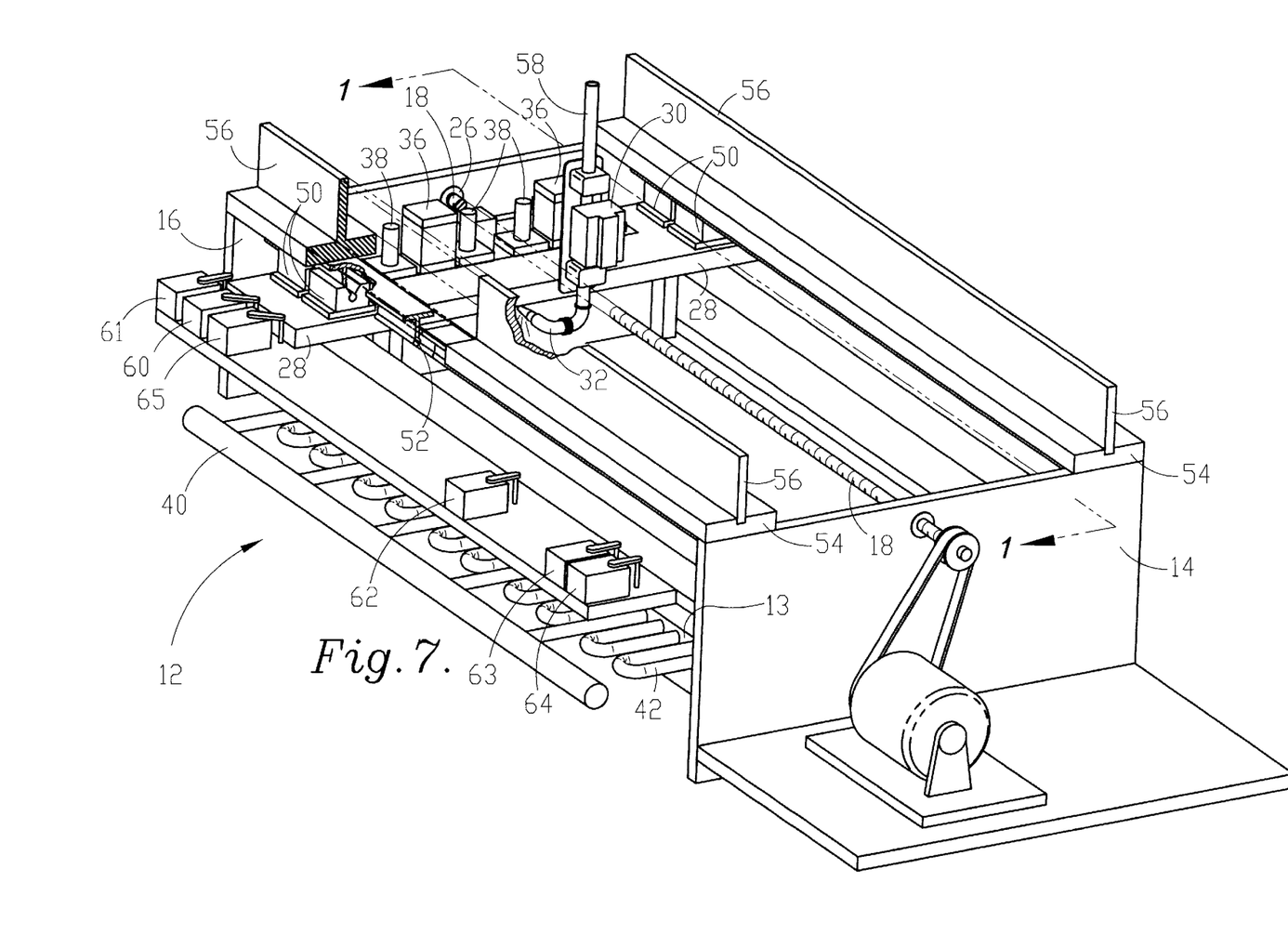
FIG. 7 is a top and left-side perspective view of the embodiment of FIG. 1 showing a dispenser on a carrier for movement of the dispenser across the plate work surface and showing the switches to activate and terminate various actions of the device.

FIG. 7 is a perspective view of the embodiment of FIG. 1. Shown in FIG. 7 are several switches which are switched off and on during the travel of carriage 28 along the work surface of the invention. An operation cycle of the invention will now be described beginning when carriage 28 is positioned at limit switch 63. At this position switch 63 has been pushed in the direction of plate 14 by the movement of carriage 28 toward plate 14. This movement of switch 63 stops the movement of carriage 28 toward plate 14 and reverses the direction of operation of motor 20 and lowers scraper 34 (FIG. 1) to contact work surface 13 and starts a timer for a timing interval. At the conclusion of the timing interval the timer activates motor 20 to send carriage 28 toward plate 16. During this movement toward plate 16, carriage 28 activates limit switch 62 to cause the opening of valve 30 to turn-on the flow of liquid from dispenser 32. Carriage 28 continues toward plate 16 and activates limit switch 65 to close valve 30 and turn-off the flow of the liquid from dispenser 32. Carriage 28 continues until it contacts limit switch 60 which stops the carriage, raises scraper 34 and activates a timer. At the end of the timing interval motor 20 is activated in the reverse direction. In the reverse direction, limit switch 62 is reset to its initial position so it can again activate the flow of liquid on the return trip of carriage 28 toward plate 16. Adjacent plate 14 and plate 16 are limit switches 61 and 64 which, if tripped, cut the power to the invention to emergency stop the travel of carriage 28.

In this manner, one cycle of operation of the invention is accomplished. That is a liquid material has been laid onto work surface 13 and solidified while on work surface 13 which is then followed by a pass along work surface 13 and cold plate 12 by carriage 28 with the scrapper in the downward position to remove the material from work surface 13 whereupon the material is pushed through void 17 (FIG. 1) and onto conveyor 39 (FIG. 1). It will be appreciated that the previous description of the operation in FIG. 7 has only described the very basic mode of operation of the present invention. It will be appreciated from the foregoing discussion that multiple passes of carriage 28 could be made on work surface 13 in order to distribute multiple layers of materials or multiple liquid and solid phases of material onto work surface 13.

Figure 8:
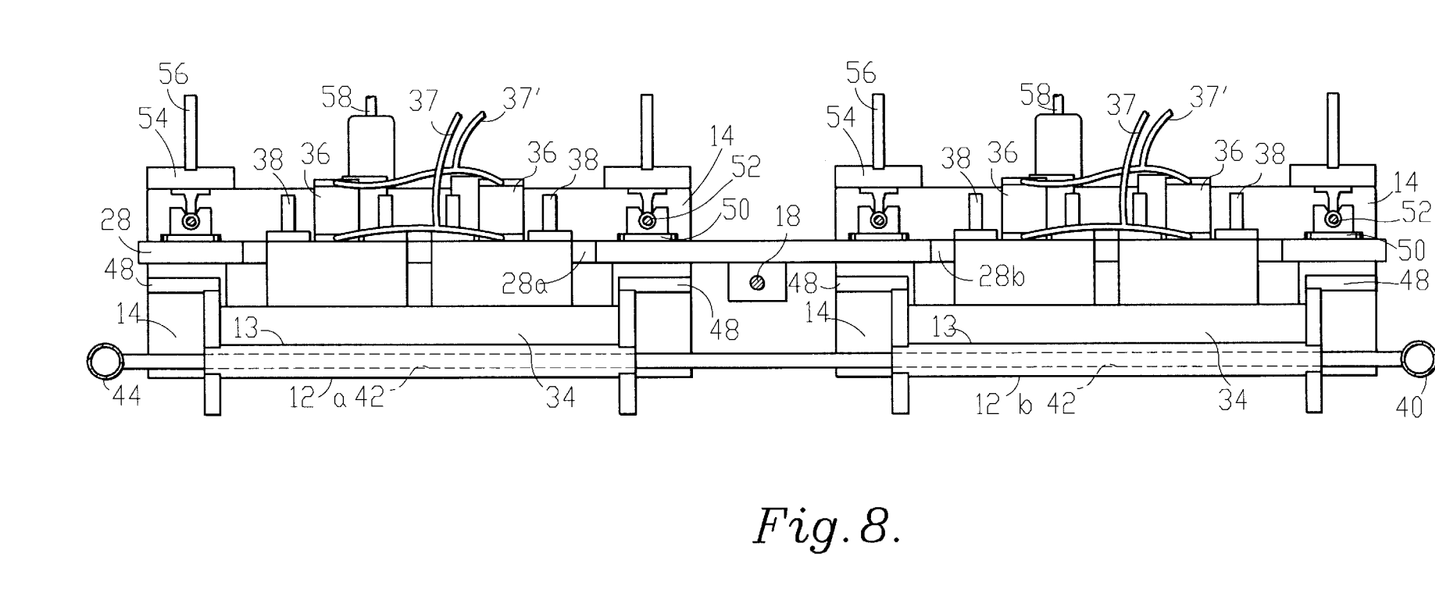
FIG. 8 is a transverse cross-sectional view of an embodiment of the present invention in which two cold plates, dispensers and scrapers are mounted side-by-side and operated by a single screw drive.

Referring now to FIG. 8, yet another embodiment of the present invention is shown wherein two iterations of the invention are placed side by side whereupon they are operated by a single screw drive 18 which is attached to carriage 28a and to carriage 28b. In the embodiment of FIG. 8, a single cooling system is utilized which introduces coolant at pipe 40 which then travels through cold plate 12a and onto cold plate 12b of the second iteration of the invention to exit from pipe 44. It will be appreciated that many such iterations of the invention could be connected in a series to operate simultaneously in order to increase the quantity of material generated during any portion of time.

Figure 9:
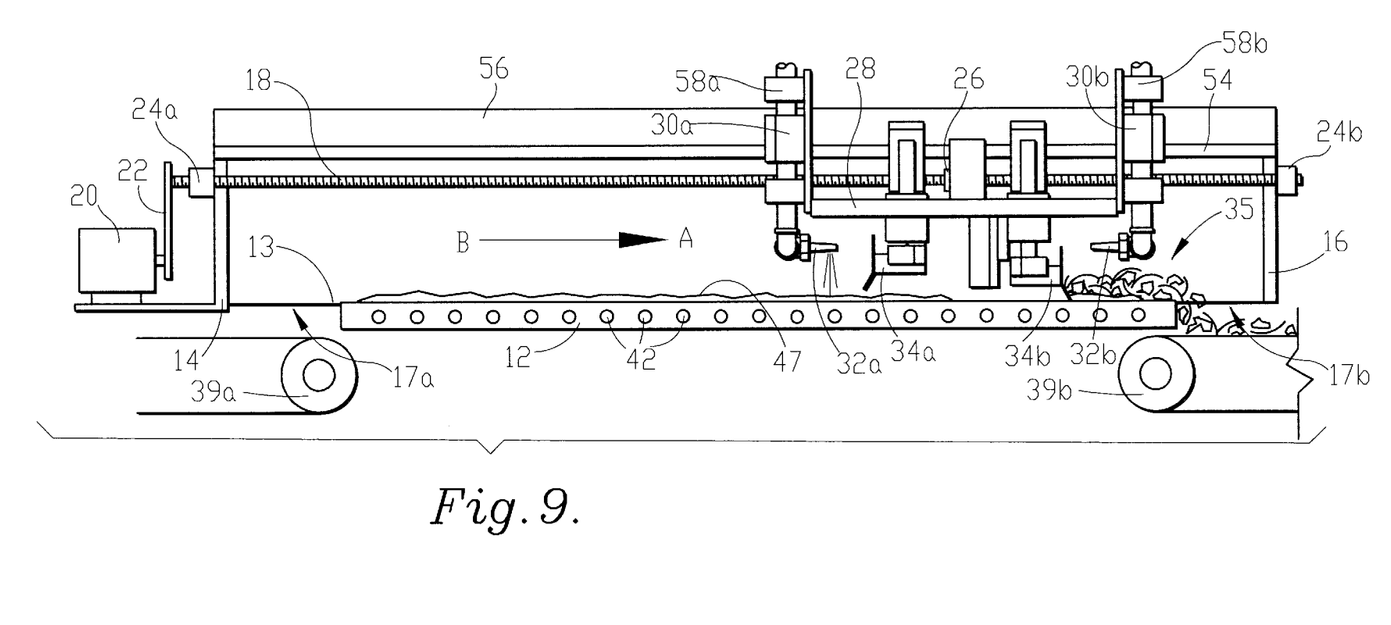
FIG. 9 is a longitudinal cross-sectional view of another preferred embodiment of the invention showing a double scraper and a double dispenser disposed on a single carrier for travel across the plate work surface.

Referring now to FIG. 9, another embodiment of the invention is shown having dual scrapers 34a, 34b and dual dispensers 32a, 32b on a single carrier 28 and dual conveyors 39a, 39b at either end. This embodiment permits layer 47 of a mixture to be dispensed onto work surface 13 while the scraping function is conducted upon a previously dispensed layer to produce flakes 35. In FIG. 9, the embodiment is shown scraping flakes 35 into void 17 for movement by conveyer 39. After an appropriate interval of time to allow sufficient solidification, scraper 34a will be lowered and carrier 28 will be moved toward end, 14 to scrape off layer 47. FIG. 10 shows the solids content of a mixture of fats at various temperatures.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

An operation cycle of the invention will now be described beginning when carriage 28 is positioned at limit switch 63. In this position switch 63 has been pushed in the directed of plate 14 by the movement of carriage 28 toward plate 14. This movement of switch 63 stops the movement of carriage 28 toward plate 14 and reverses the direction of operation of motor 20 and lowers scraper 34(FIG. 1) to contact work surface 13 and starts a timer for a timing interval. At the conclusion of the timing interval the timer activates motor 20 to send carriage 28 toward plate 16. During this movement toward plate 16, carriage 28 activates limit switch 62 to cause the opening of valve 30 to turn-on the flow of liquid from dispenser 32. Carriage 28 continues toward plate 16 and activates limit switch 65 to close valve 30 and turn-off the flow of the liquid from dispenser 32. Carriage 28 continues until it contacts limit switch 60 which stops the carriage, raises scraper 34 and activates a timer. At the end of the timing interval motor 20 is activated in the reverse direction. In the reverse direction, limit switch 62 is reset to its initial position so it can again active the flow of liquid on the return trip of carriage 28 toward plate 16.

Having now described the features, discoveries and principles of the invention, the manner in which the inventive Plate Flaker is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention, what is claimed as new and desired to be secured by Letters Patent is as follows:

1. An apparatus for forming a solid from a liquid and for adding a preexisting solid to the solid formed from the liquid comprising:
   a generally horizontal flat plate stationary work surface maintained at a temperature selected to remove sufficient heat from the liquid to change the liquid into the solid,
   a dispenser to distribute the liquid on said work surface to form the solid,
   a solids applicator to distribute a preexisting solid on said work surface; and
   a scraper to remove the formed solid and said distributed preexisting solid from said work surface.

2. The apparatus as claimed in claim 1 where in said preexisting solid has a melting point of at least 120 degrees Fahrenheit.

3. The apparatus as claimed in claim 1 further comprising a carriage mounted above said work surface for reciprocating movement thereacross, said carriage having said solids applicator attached thereto.

4. The apparatus as claimed in claim 1 wherein said liquid comprises a liquid edible oil or liquid fat or liquid emulsifier having a melting point of less than about 105 degrees Fahrenheit.

5. A method for forming a solid from a liquid and for adding a preexisting solid to the solid formed from the liquid comprising:
   adjusting a generally horizontal flat plate work surface to a temperature sufficient to change a liquid into the solid,
   dispensing a layer of said liquid onto the work surface,
   applying a preexisting solid onto said work surface,
   allowing the solid to form from said liquid, and
   scraping the formed solid and said applied preexisting solid from said work surface.

6. The method as claimed in claim 5 wherein said liquid comprises a liquid edible oil or liquid fat or liquid emulsifier having a melting point of less than about 105 degrees Fahrenheit.

7. A method for forming a solid from a liquid comprising:
   circulating a coolant through voids in a generally horizontal flat plate work surface,
   adjusting said work surface temperature with said circulating coolant to a temperature sufficient to change a liquid into the solid,
   moving a nozzle between a first end and a second end of said work surface to dispense a layer of said liquid onto the work surface,
   moving a solids applicator between a first end and a second end of said work surface to dispense a preexisting solid onto the work surface,
   allowing said dispensed liquid layer to form said solid,
   moving a blade between said first and second ends of said work surface, and
   contacting said work surface with said blade during said blade moving step to scrape the formed solid and said dispensed preexisting solid from said work surface.

8. The method as claimed in claim 7 wherein said liquid comprises a liquid edible oil or liquid fat or liquid emulsifier having a melting point of less than about 105 degrees Fahrenheit.

9. A method for forming a solid from a liquid comprising:
   adjusting a generally horizontal flat plate work surface to a temperature sufficient to change the liquid into the solid, reciprocating a carriage between a first end and a second end of said work surface, said carriage having a nozzle for dispensing a liquid onto the work surface and said carriage having a blade for scraping the work surface dispensing a layer of said liquid onto the work surface during a reciprocation of said carriage, applying a preexisting solid onto said work surface, allowing said dispensed liquid layer to form a solid, and scraping the formed solid and said applied preexisting solid off said work surface during a reciprocation of said carriage.

10. The method as claimed in claim 9 wherein said liquid comprises a liquid edible oil or liquid fat or liquid emulsifier having a melting point of less than about 105 degrees Fahrenheit.

11. An apparatus for forming a solid from a liquid comprising:

a generally horizontal flat plate having an exterior work surface, said plate maintained at a selected temperature, said temperature being selected to transform a liquid into a solid, a dispenser to traverse said work surface to dispense said liquid onto said work surface to form said solid, a solids applicator to distribute a preexisting solid on said work surface, and a scraper to traverse said work surface to remove said solid and said distributed preexisting solid from said work surface.

12. The apparatus as claimed in claim 11 further comprising a carriage mounted above said work surface for reciprocating movement thereacross, said carriage having said solids applicator attached thereto.

13. The method as claimed in claim 11 wherein said liquid comprises a liquid edible oil or liquid fat or liquid emulsifier having a melting point of less than about 105 degrees Fahrenheit.

14. A method for forming a solid from a liquid comprising:

circulating a coolant through voids in a generally horizontal flat plate work surface, adjusting said work surface temperature with said circulating coolant to a temperature sufficient to change a liquid into a solid, moving a nozzle between a first end and a second end of said work surface to dispense a layer of said liquid onto the work surface, allowing said dispensed liquid layer to form said solid, spreading a layer of a preexisting solid on said work surface, and moving a blade between said first and second ends of said work surface, contacting said work surface with said blade during said blade moving step to scrape said formed solid and said spread preexisting solid from said work surface.

15. The method as claimed in claim 14 wherein said liquid comprises a liquid edible oil or liquid fat or liquid emulsifier having a melting point of less than about 105 degrees Fahrenheit.

16. A method for forming solid flakes of fats or emulsifiers from a liquid fat or a liquid emulsifier comprising the steps of:

adjusting a generally horizontal flat plate stationary work surface to a temperature sufficient to change a liquid fat or emulsifier into a solid fat or solid emulsifier, dispensing a layer of said liquid fat or liquid emulsifier onto said work surface, allowing said liquid layer to solidify into a fractureable solid sheet on said work surface, scraping the formed solid sheet from said work surface, and fracturing said sheet into flakes during said scraping step.

17. The method as claimed in claim 16 wherein said fat is a hydrogentated triglyceride having a solids composition which falls below an agglomeration boundary.

18. The method as claimed in claim 16 wherein said liquid comprises a liquid fat or liquid emulsifier having a melting point of less than about 105 degrees Fahrenheit.

19. A method for forming solid flakes of fats or emulsifiers from a liquid fat or liquid emulsifier comprising the steps of:

adjusting a generally horizontal flat plate stationary work surface to a temperature sufficient to change a liquid fat or emulsifier into a solid fat or solid emulsifier, dispensing a layer of said liquid fat or liquid emulsifier onto said work surface, solidifying said liquid layer into a solid sheet on said work surface, producing sufficient nucleation in said solid during said solidifying step to allow flaking of the solid sheet, scraping the formed solid sheet from said work surface, and fracturing said sheet into flakes during said scraping step.

20. The method as claimed in claim 19 wherein said fat is a hydrogentated triglyceride having a solids composition which falls below an agglomeration boundary.

21. The method as claimed in claim 19 wherein said liquid comprises a liquid fat or liquid emulsifier having a melting point of less than about 105 degrees Fahrenheit.

* * * * *